United States Patent
Keane et al.

(10) Patent No.: US 6,778,921 B2
(45) Date of Patent: Aug. 17, 2004

(54) MODULAR ARCHITECTURE FOR INDUSTRIAL POWER DELIVERY SYSTEM

(75) Inventors: Anthony R. A. Keane, Webster Road, NY (US); Aaron T. Radomski, Wyoming, NY (US); William R. Pulhamus, Jr., Bloomfield, NY (US)

(73) Assignee: ENI Technology, Inc., Providence, RI (US)

( * ) Notice: Subject to any disclaimer, the term of this patent is extended or adjusted under 35 U.S.C. 154(b) by 262 days.

(21) Appl. No.: 09/827,520

(22) Filed: Apr. 6, 2001

(65) Prior Publication Data

US 2004/0015245 A1 Jan. 22, 2004

(51) Int. Cl.[7] ................................ G06F 19/00
(52) U.S. Cl. ...................... 702/62; 307/31; 702/64; 702/65; 324/76.11; 324/126
(58) Field of Search ................ 307/31, 39, 98, 307/153, 154, 33; 702/62, 64, 65; 324/126, 76.11, 468, 76.52, 76.78

(56) References Cited

U.S. PATENT DOCUMENTS

| | | | | |
|---|---|---|---|---|
| 4,375,051 A | * | 2/1983 | Theall | 333/17 |
| 5,614,813 A | * | 3/1997 | Batson | 323/283 |
| 5,831,479 A | | 11/1998 | Leffel et al. | |
| 5,867,060 A | | 2/1999 | Burkett, Jr. et al. | |

FOREIGN PATENT DOCUMENTS

WO     WO 00/30148     5/2000

* cited by examiner

*Primary Examiner*—Robert DeBeradinis
(74) *Attorney, Agent, or Firm*—Harness, Dickey & Pierce, P.L.C.

(57) ABSTRACT

An industrial power delivery system configured in a modular architecture and having a plurality of modules. The modules interconnect via digital communication links and exchange data using a digital format. The modularity of the system enables the system to be scaled to vary future content of the product.

23 Claims, 5 Drawing Sheets

US 6,778,921 B2

MODULAR ARCHITECTURE FOR INDUSTRIAL POWER DELIVERY SYSTEM

BACKGROUND

1. Technical Field

The present invention relates generally to industrial power delivery systems and, more particularly, to an industrial power delivery system having a modular architecture with digital communications links interconnecting the modules.

2. Discussion

Conventional power delivery systems are typically serviced by power supplies which are specifically designed for that particular application. These power supplies, however, lack modularity and flexibility for expansion in order to facilitate design and manufacture. Further, such power supplies do not typically include fault tolerant communications between modules. Further yet, such power supplies have limited redundancy and power handling capability.

With reference to a specific application, material processing such as plasma deposition and sputtering through the utilization of plasmas has been known for many years. These processes require power delivery systems. Such processes generally require generation of either a radio frequency (RF) or high voltage direct current (DC) power signal coupled to a plasma chamber. Generating a power signal generally entails chopping and rectifying relatively high voltages, such as 270 Volts DC. The chopping and rectifying process generates spurious electric and magnetic fields that couple into nearby circuitry resulting in a relatively high electrical noise environment. The spurious fields that couple into data circuitry may cause a degradation in signal quality leading to possible data corruption. High-speed data communication lines are particularly susceptible to signal degradation and data corruption due to the relatively low noise signal amplitudes required for high speed communications.

Thus, it is desirable to provide a power supply which enables design flexibility and scalability for an industrial power delivery system and provides data communications unaffected by the power supply environment.

SUMMARY OF THE INVENTION

This invention is directed to a power generator system including a power module for receiving an electrical energy input and generating an electrical energy output, the power module includes a digital control input. A sensor module monitors the output of the power module. The sensor module includes a digital sensor output and generates a digital sensor signal on the digital sensor output that varies in accordance with the electrical energy output. A control module has a digital measurement input for receiving the sensor signal. The control module determines parameters that vary in accordance with the electrical energy output. The control module includes a digital control output connected to the digital control input. The control module generates a control signal applied to the digital control input for controlling the power module.

This invention is also directed to a power delivery system that receives an input power and generates an output power to a load. The power delivery system includes a power generator which receives the input power and generates the output power. The power generator includes a first digital interface. An impedance matching network is interposed between the power generator and the load. The impedance match network including a second digital interface. An output sensor is disposed in proximity to the load and senses a parameter associated with the power generator output. The output sensor includes a third digital interface and generates a digital sensor signal via the third digital interface that varies in accordance with the sensed parameter. A controller receives the sensor signal and determines a control signal for output to the power generator. The controller includes a fourth digital interface and generates the control signal via the fourth digital interface for communications with the first digital interface. The power generator varies the output power in accordance with the control signal.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
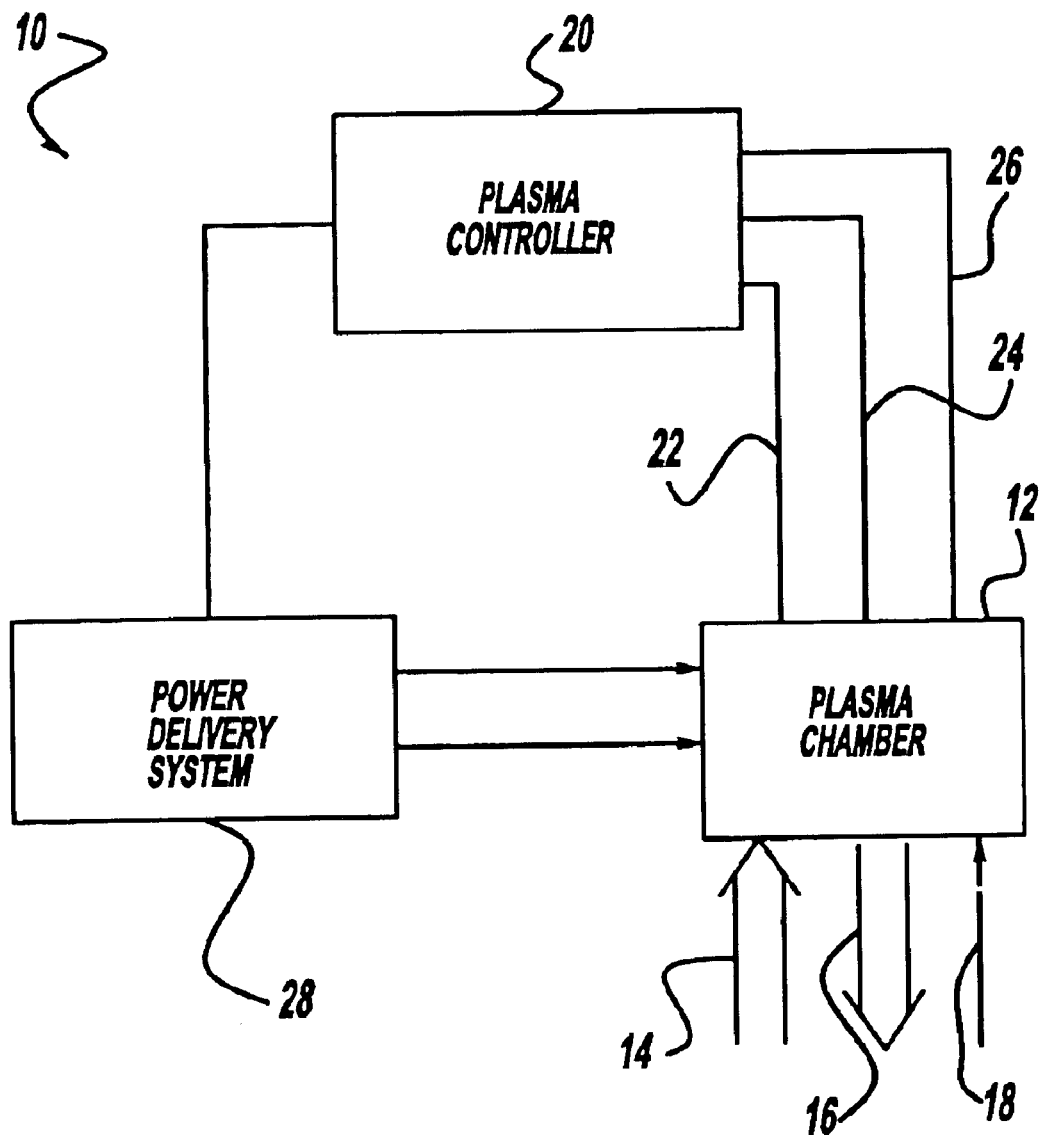
FIG. 1 depicts a block diagram of a plasma chamber control system having a power delivery system arranged in accordance with the principals of the present invention.

FIG. 1 depicts a plasma control system 10 arranged in accordance with the principles of the present invention for controlling a plasma chamber 12. Plasma control system 10 includes a plasma chamber 12, such as may be used for fabricating integrated circuits. Plasma chamber 12 includes one or a plurality of gas inlets 14 and one or a plurality of gas outlets 16. Gas inlet 14 and gas outlet 16 enable the introduction and evacuation of gas from the interior of plasma chamber 12. The temperature within plasma chamber 12 may be controlled through a heat control signal 18 applied to plasma chamber 12.

A plasma controller 20 receives inputs from the plasma chamber 12. These inputs include a vacuum signal 22 which indicates the level of vacuum in plasma chamber 12, a voltage signal 24, and a signal 26 indicating the ratio of flows between the inlet and the outlet gases. As one skilled in the art will recognize, other inputs/outputs may be received/generated by plasma controller 20. Plasma controller 20 determines a desired input power to be applied to plasma chamber 12 through a power delivery system 28, as will be described in greater detail herein. Power delivery system 28 outputs a predetermined electrical signal at a predetermined frequency and power rating. The voltage output from power delivery system 28 is applied to plasma chamber 12 in order supply sufficient energy to operate plasma chamber 12.

Figure 2:
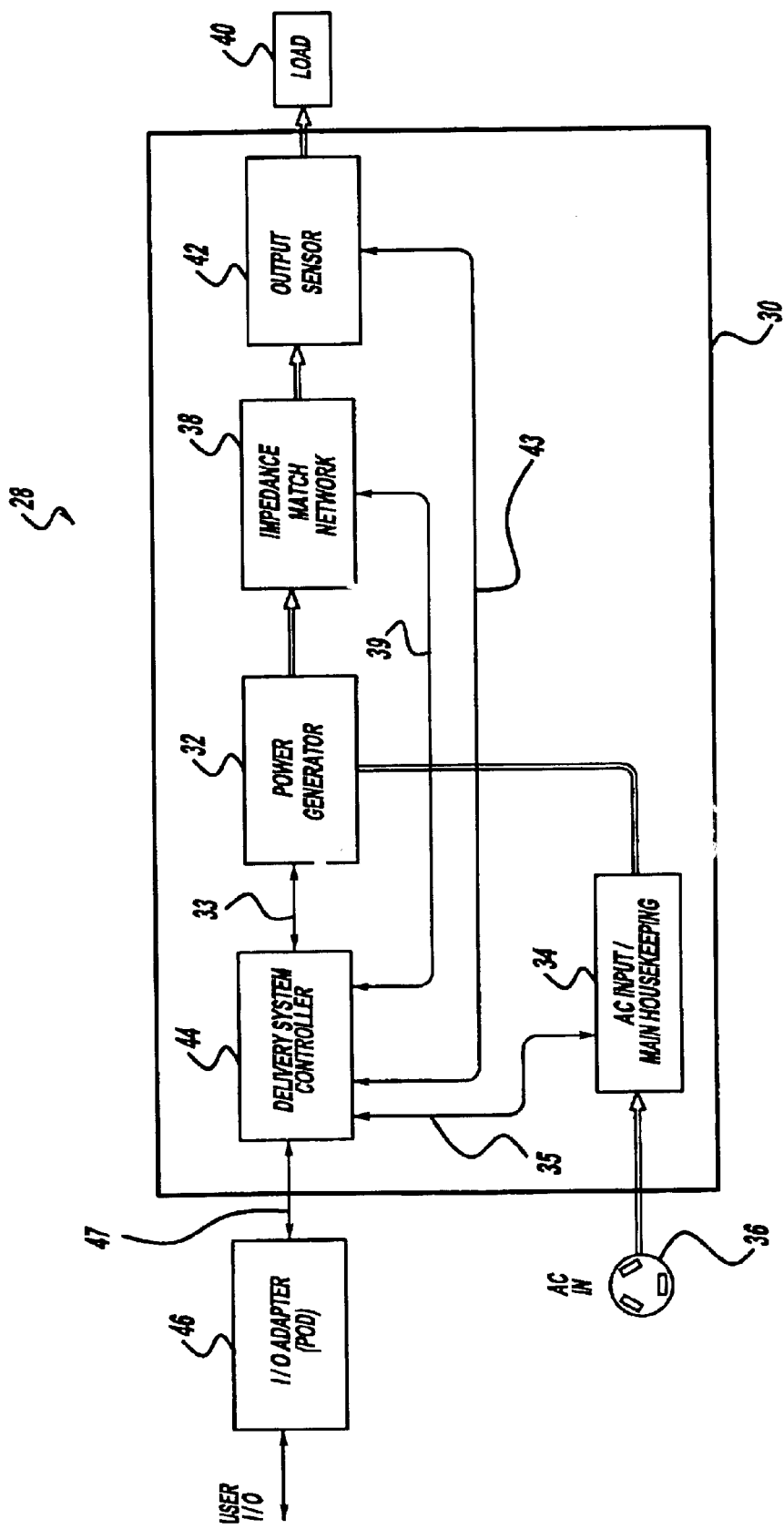
FIG. 2 is a block diagram of a power delivery system of FIG. 1 arranged in accordance with the principles of the present invention.

FIG. 2 depicts a block diagram of power delivery system 28. Power delivery system 28 includes a delivery system 30 which includes a power generator or power generator module 32. Power generator 32 receives an input signal, such as an alternating current (AC) input signal from AC input/main housekeeping module 34. Power is received by AC input 34 through an AC receptacle 36. AC input 34 conditions the AC signal for application and input to power generator 32. Power generator 32 is embodied as any device which converts an input signal to a predetermined output signal. AC input 34 also converts the AC input signal to a low level direct current (DC) signal for powering logic level components.

Preferably, power generator 32 is configured to output a radio frequency (RF) signal by converting the AC input to a predetermined DC voltage. A pair of switches, such as a push pull amplifier configuration, in turn converts the DC voltage to an RF output voltage which may be filtered prior to output from power generator 32. The operation of power generator 32 may be any type of conventional operation known in the art, including single and two stage conversions.

Of particular interest to the subject invention is the interconnection between the modules of power delivery system 28 and power generator 32, as will be described herein. Power generator 32 generates an output voltage to an impedance match network or module 38 prior to application to a load 40. Impedance match module 38 typically provides a variable impedance between power generator 32 and load 40 in order to maintain a predetermined impedance at the output of power generator 32, typically 50 ohms.

An output metrology module or output sensor 42 receives the power output from impedance match network 38 prior to application to load 40. Output sensor 42 measures predetermined parameters found in the output from impedance match network 38. For example, output sensor 42 may measure one or a plurality of parameters including voltage, current, power, frequency, phase, or other parameters of interest in generating a power output to load 40.

Both impedance match network 38 and output sensor 42 generate data signals to delivery system controller 44. Delivery system controller 44 receives data signals from one or both impedance match network 38 and output sensor 42. Delivery system controller 44 receives the data and generates at least one of a control or data signal to power generator 32, as will be described in greater detail herein. Delivery system controller 44 may also generate control signals to or exchange data with each of match network 38 and output sensor 42.

Delivery system controller 44 also exchanges data and control signals with an input/output (I/O) adapter or adapter module 46, also known as a peripheral optional device (POD). I/O adapter 46 enables communications with external devices, such as an overall system controller, plasma system controller, test module, user input module, or other modules which may desire to share data with or control operation of delivery system 30. Delivery system controller 44 also exchanges data and control signals with AC input 34 to enable control of AC input 34.

A particular feature of the subject invention is directed to communications between various modules of power delivery system 28. More specifically, delivery system controller 44 functions as a common controller core which interconnects system and subsystem modules via high speed, digital communications links 33, 35, 39, 43, and 47. These communications links enable single or bidirectional communications for data and control signals as design criteria dictates. Communications link 33 interconnects power delivery system 44 with delivery system controller 44 to enable high speed, bidirectional communications. Communications link 39 interconnects impedance match network 38 with delivery system controller 44 as required. Communications link 35 interconnects AC input 34 with delivery system controller 44. Communications link 43 interconnects output sensor 42 with delivery system controller 44 as required. Communications link 47 interconnects I/O adapter 46 with delivery system controller 44.

As will be described herein, such a configuration enables systems with different features to be assembled independently of the technologies utilized in the modules. Accordingly, power delivery system designs of varying scope and complexity may be developed more quickly and more reliably.

Delivery system controller 44 communicates with each of power generator 32, impedance match network 38, output sensor 42, AC input 34, and I/O adapter 46 using a digital communications protocol, which preferably is a high speed digital communications protocol. The protocol may include error detection and correction to improve reliability of communications between system controller 44 and each device with which power controller 44 exchanges data. Such a protocol enables control and feedback signals to have a very high dynamic range compared to traditional analog methods for control and measurement. To effect the digital communications, each module described herein may have a digital communications port, and each communications link functions cooperatively to define a digital interface between the connected modules to exchange data and control signals.

More specifically, power delivery system 44 communicates with the modules in a technology-independent manner across the communications links 33, 35, 39, 43, and 47 so that data may be encoded for communications between, for example, power delivery system controller 44 and impedance match network 38, output sensor 42, AC input 34, and I/O adapter 46. That is, data is exchanged using a protocol rather than traditional analog voltages, which can be sensitive to noise. The data communications between the respective modules transfer values rather than signal levels indicative of a value. For example, if output sensor 42 measures one or all of voltage, current, or power, output sensor 42 outputs a digital signal to indicate respective volts, amperes, or watts. In such a configuration, the modules operate independently of methods used for determining these quantities. The modules simply determine the value of the quantity of interest. As an added benefit, the modules are redesigned, the redesigned modules may be substituted so long as they use the predetermined communications protocol.

Figure 3:
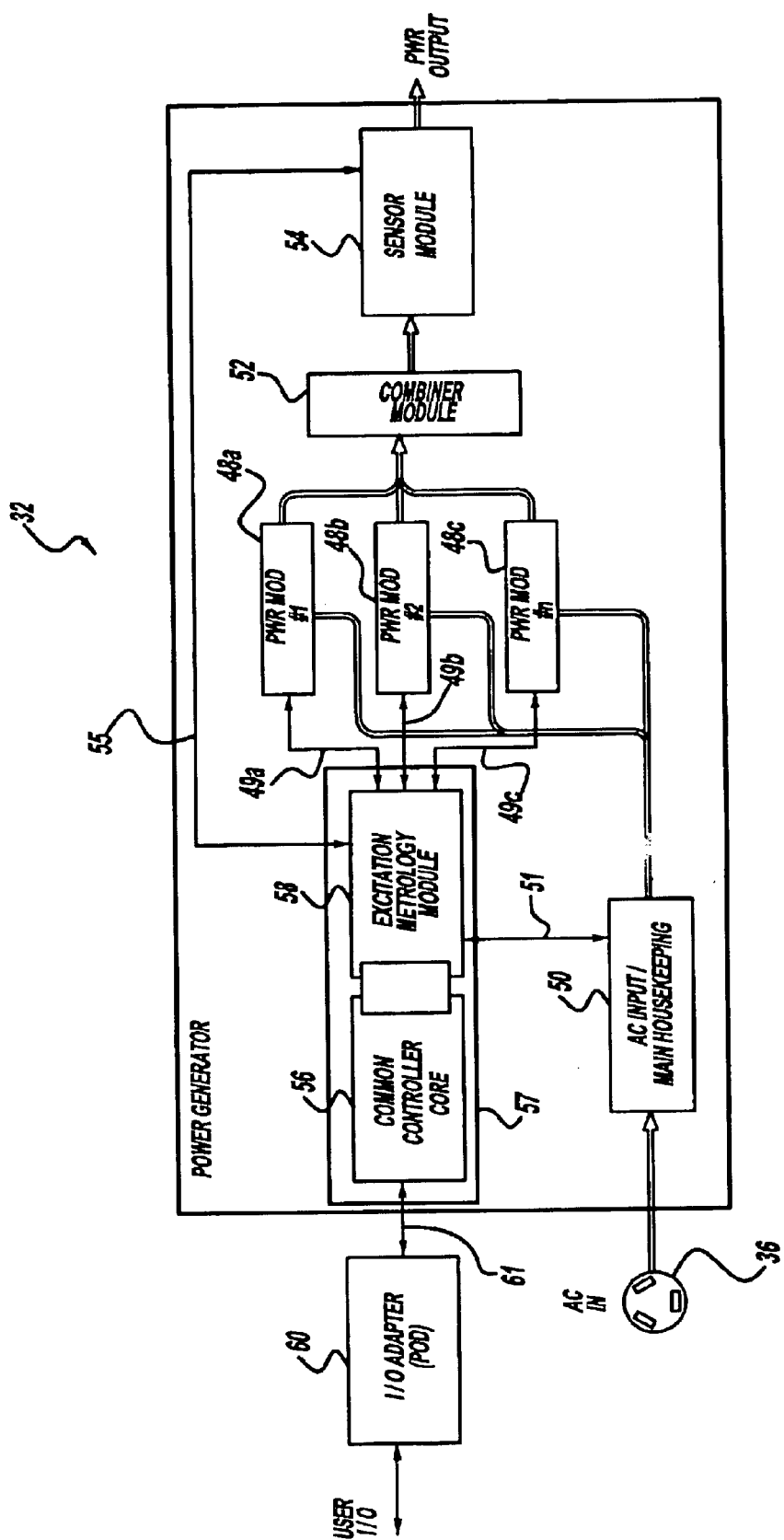
FIG. 3 is a block diagram of the power generator of FIG. 2.

In the block diagram of FIG. 3, power generator 32 includes one or a plurality of modules interconnected using digital communication links 49a, 49b, 49c, 55, 51, and 61, which operate similarly to those described with respect to power delivery system 28 of FIG. 2. Power generator 32 is particularly directed to flexibility in providing power modules so that the power output of power generator 32 may be scaled in accordance with the particular design requirements. Power generator 32 includes a plurality of power modules 48a, 48b, 48c. Power modules 48 receive an input power from AC input/main housekeeping module 50, which operates as described above with respect to FIG. 2, and generates an output power. The output power is applied to combiner module 52.

Combiner module 52 receives the respective outputs from power module 48a, 48b, and 48c and combines the outputs for application to sensor module 54. Sensor module 54 may operate similarly as described with respect to output sensor 42 of FIG. 2. More particularly, sensor module 54 may monitor particular parameters of the output power generated by power generator 32. That is, sensor module 54 senses parameters in the output power generated by power generator 32 prior to application to impedance match network 38 of FIG. 2. On the other hand, output sensor 42 measures predetermined parameters prior to application of the output power to load 40.

Power generator 32 also includes a control module 57 including common controller core 56. Common controller core 56 operates as a local controller for power generator 32. Common controller core 56 is interconnected to an excitation/metrology module 58, which also forms part of control module 57. Control module 57 exchanges data and control commands with a predetermined, variable number of power modules 48, such as power modules 48a, 48b, 48c, sensor module 54, and AC input 50 via digital communications links 49a, 49b, 49c, 55, and 51. The number of power modules varies in accordance with the desired output of power generator 32. Control module 57 also exchanges data and control commands with I/O adapter 60 via digital communications link 61.

Excitation/metrology module 58 receives data from sensor module 54 and general parameters of operation from common controller 56. Control module 57 and its components then generates control commands to operate each of respective power modules 48a, 48b, 48c in order to vary the power output from each power module 48a, 48b, 48c, prior to application to combiner module 52. Data may be exchanged between each of these modules as described above with respect to FIG. 2. In particular, excitation/metrology module 58 exchanges data with each of power modules 48a, 48b, 48c, sensor module 54, AC input 50, and I/O adapter 60 utilizing digital communications implementing any of a number of predetermined communications protocols.

Figure 4:
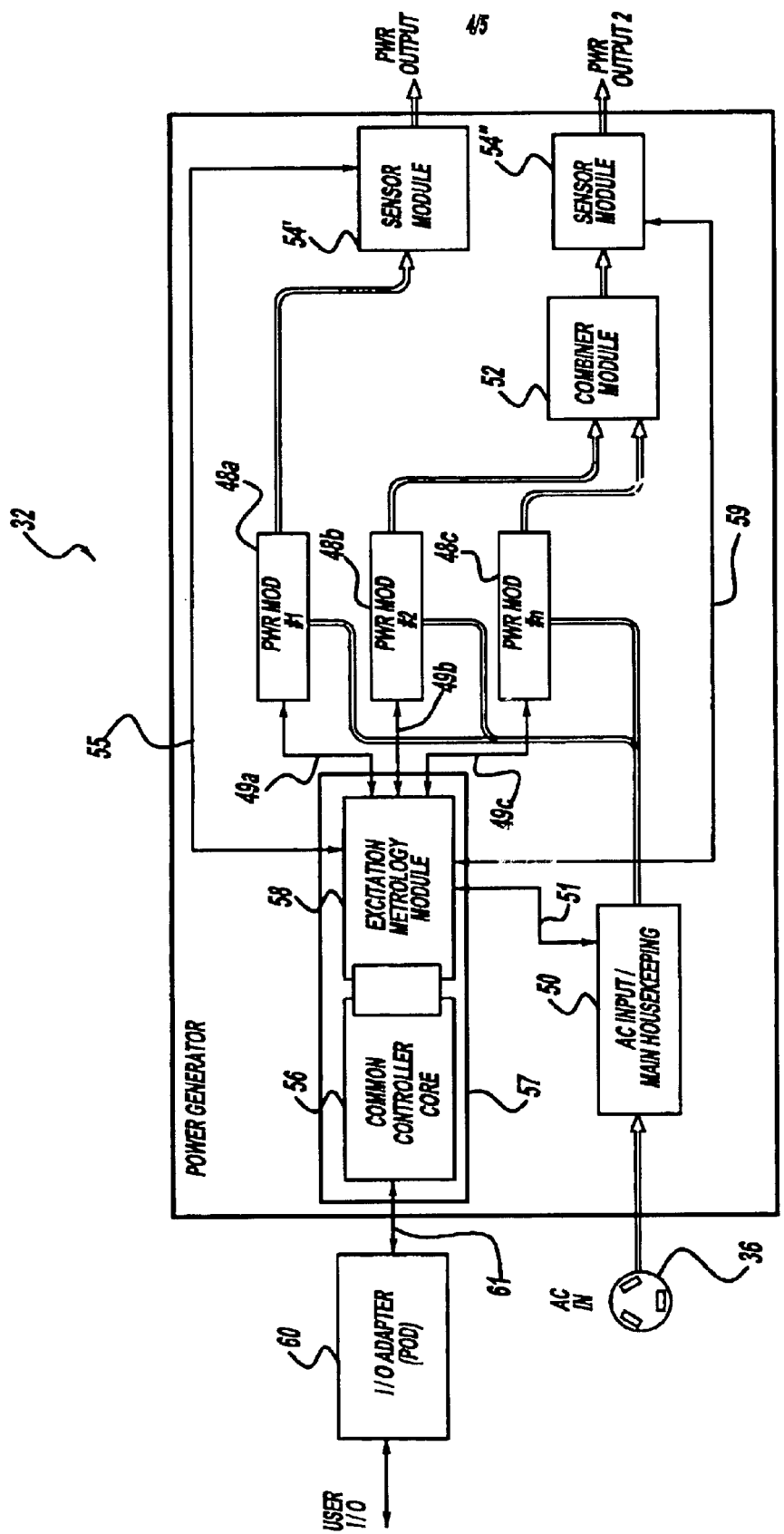
FIG. 4 is a block diagram of an alternate arrangement of the power generator of FIG. 2.

FIG. 4 depicts a block diagram of an alternative embodiment of power generator 32. The power generator 32 of FIG. 4 is similar to power generator 32 of FIG. 3 with the exception that power modules 48a, 48b, 48c do not all feed combiner module 52, as will be described in greater detail herein. Because of similarities between FIGS. 3 and 4, like reference numerals from FIG. 3 will be used to refer to like elements in FIG. 4.

The components of FIG. 4 operate similarly as described in FIG. 3 with the exception that the outputs from each respective power module 48a, 48b, 48c, are combined to generate a pair of power outputs power output 1 and power output 2. Power module 1 48a provides an output to sensor module 54' which then provides power output 1. As described above, sensor module 54' may monitor particular perimeters of the output power generated by power module 1 48a. Similarly to FIG. 3, power module 2 48b and power module 3 48c provide respective outputs which are applied to combiner module 52. Combiner module 52 receives the respective outputs from power modules 48b and 48c and combines the outputs for application to sensor module 54". Sensor module 54" senses parameters in the output power generated by power generator 32 prior to application to impedance match network 38 of FIG. 2. Sensor module 54" provides an output signal on communications link 59 to excitation/metrology module 58, which operates as described above.

The configuration of FIG. 4 provides flexibility, such as may be required when power generator 32 must generate dual frequency outputs. In this manner, power module 48a may output a first frequency, and power modules 48b and 48c may output a second frequency. As shown in FIG. 3, power modules 48b and 48c are combined by combiner module to provide a higher power output at the second predetermined frequency.

Power generators 32 of FIGS. 3 and 4 may operate in conjunction with power delivery system 28 of FIG. 2. Alternatively, power generators 32 may operate independently and outside of a power delivery system to implement a less complex system. In such a configuration, power generators 32 may also include an I/O input/output adapter module 60 to enable communication with other devices as described above with respect to FIG. 2.

Figure 5:
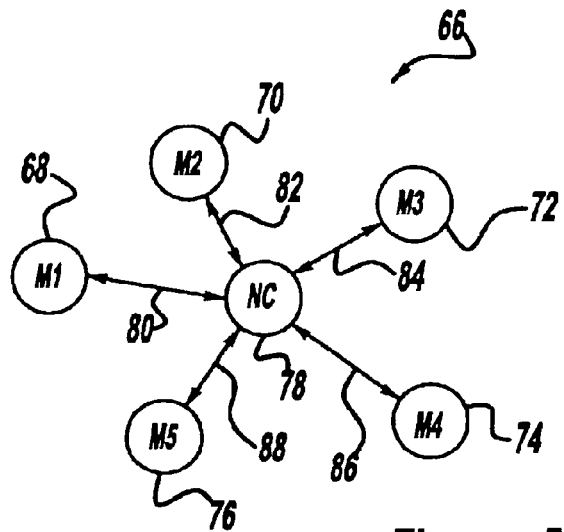
FIG. 5 is a star network configuration for linking the modules of the present invention.

As discussed above, the modules described with respect to FIGS. 2 and 3 may be interconnected and exchanged using a digital communications format. Interconnection of the modules may be achieved using direct or network communications. Examples of network communications of the modules may be seen with respect to FIGS. 5 through 7. In particular, FIG. 5 depicts a star network 66 having a plurality of modules M1 68, M2 70, M3 72, M4 74, and M5 76. A plurality of communications links interconnect each module with network controller or connector NC 78. For example, communications link 80 interconnects module M1 68 with network controller NC 78. Communications link 82 interconnects module M2 70 with network controller NC 78. Communications link 84 interconnects module M3 72 with network controller NC 78. Communications link 86 interconnects module M4 74 with network controller NC 78. Communications link 88 interconnects module M5 76 with network controller NC 78. Star network 66 enables each respective module M1 through M5 to communication directly with each of another respective module through network controller NC 78.

FIG. 5 depicts a network 90 having a plurality of modules M1 92, M2 94, M3 94, M3 96, M4 98, and M5 100. The modules of network 90 communicate directly and without the need for a network controller, as each module operates as a network controller. For example, communications link 104 interconnects module M1 92 with module M2 94. Communications link 106 interconnects module M1 92 with module M3 96. Communications link 108 interconnects module M1 92 with module M4 98. Communications link 110 interconnects module M1 92 with module M5 100. Communications link 114 interconnects module M2 94 with module M3 96. Communications link 116 interconnect module M2 94 with module M4 98. Communication link 118 interconnects module M2 94 with module M5 100. Communications link 122 interconnects module M3 96 with module M4 98. Communications link 124 interconnects module M3 96 with module M5 100. Communications link 126 interconnects module M4 98 with module M5 100.

Figure 6:
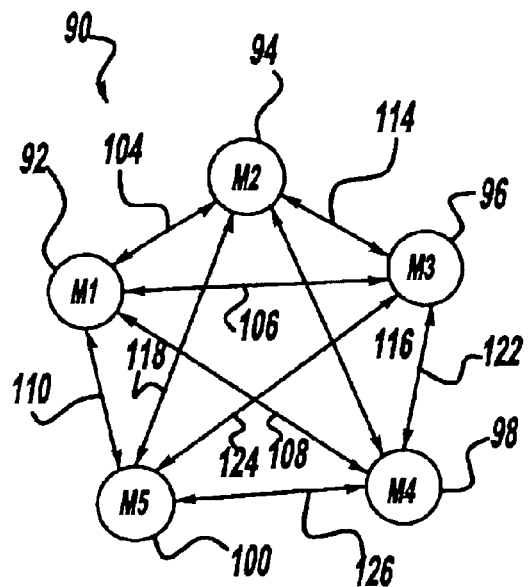
FIG. 6 is a more generalized star network configuration for linking the modules of the present invention.

Network 90 enables each respective module M1 through M5 to communication directly with each of another respective module. Each module M1 through M5 inherently functions as a network controller to select the best path between any two modules. Communications need not occur directly module to module and may occur through modules. For example, module M1 92 may communication directly with module M4 98 through communications link 108. Alternatively, module M1 92 may communication with module M4 98 by first communicating with M2 94 through communications link 104. Module M2 94 may then communicate with module M4 98 through communications link 116. In the configuration of FIG. 6, each module operates as if in an internet-type configuration.

Figure 7:
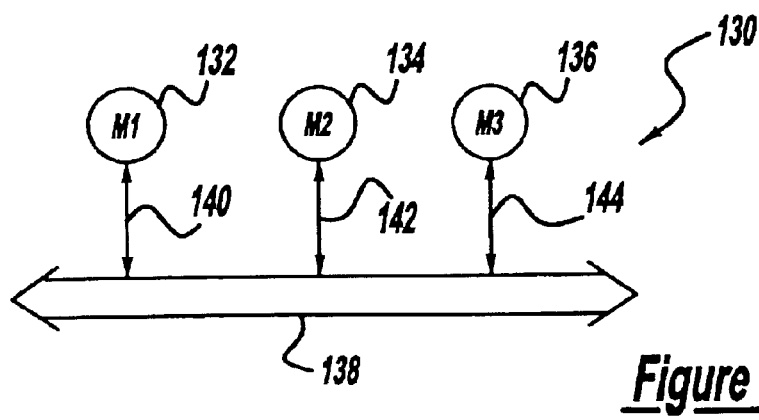
FIG. 7 is a bus network configuration for interconnecting the modules arranged in accordance with the principals of the present invention.

FIG. 7 depicts an alternate network configuration. In particular, FIG. 6 depicts a bus network 130 having modules M1 132, M2 134, and M3 136. The modules M1 132, M2 134, and M3 136 communicate via a bus 138. Accordingly, each module M1 132, M2 134, and M3 136 is addressable so that data may be exchanged via bus 138 using any of a number of bus addressing schemes. A plurality of communications links interconnect the modules to bus 138. In particular, communications link 140 interconnects module M1 132 to bus 138. Communications link 142 interconnects module M2 134 with bus 138. Communications link 144 interconnects module M3 136 with bus 138.

The communication links described above are implemented utilizing single or multi-layer protocols, many of which are known in the art. Utilizing a multi-layer protocol enables substitution of modules and scalability of modules so long as each substituted or added module utilizes the particular layered protocol. Further, the communications links may be implemented using a number of known formats including low voltage differential (LVD), fiber optic cables, infrared transceivers, and wireless, radio communication techniques. Further yet, as discussed above, power generator 32 may be incorporated within power delivery system 28 or may operate independently of power delivery system 28.

Accordingly, the invention described herein provides a modular architecture for an industrial power delivery system which is both modular and scaleable. The power delivery system enables different features to be assembled independently of the technologies used in the modules. Accordingly, power delivery products with expanded or reduced capabilities can be produced much more quickly.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A power generator system comprising:
    a power module for receiving an electrical energy input and generating an electrical energy output, the power module having a data input for receiving and decoding information;
    a sensor module for monitoring the output of the power module, the sensor module having a data output for encoding and transmitting information and generating a digitally encoded data sensor signal on the data output that varies in accordance with the electrical energy output, wherein the data sensor signal is transmitted in accordance with a communications protocol; and
    a control module having a data input or receiving and decoding the sensor signal, the control module determining parameters that vary in accordance with the electrical energy output, the control module including a control data output connected to the data input for encoding and transmitting information, the control module generating a data control signal applied to the data input for controlling the power module.

2. The power generator system of claim 1 further comprising a data link interconnecting at least a pair of the sensor module, the control module, the power module, an AC input module, and an input/output adapter module to enable communications therebetween in accordance with the communication protocol.

3. The power generator system of claim 2 wherein the data link further comprises one of a low voltage differential communications link, a fiber optic communications link, an infrared communications link, a line of sight optical communications link, and a wireless communications link.

4. The power generator system of claim 2 wherein the data link implements a predetermined communications protocol.

5. The power generator system of claim 4 wherein the communications protocol includes error detection.

6. The power generator system of claim 1 wherein the modules are interconnected in a communications network.

7. The power generator system of claim 1 further comprising a plurality of power modules, each power module receiving an electrical energy input and generating an electrical energy output, each power module having a control input, each control input receiving and decoding an encoded a control signal from the measurement module for varying the electrical energy output.

8. The power generator system of claim 7 further comprising a power combiner, the power combiner receiving the electrical energy output from at least two of the plurality of power modules and generating a combined electrical energy output in accordance therewith.

9. A power delivery system receiving an input power and generating an output power to a load comprising:
    a power generator, the power generator receiving the input power and generating the output power, the power generator including a first digital interface for exchanging encoded information;
    an impedance matching network interposed between the power generator and the load, the impedance matching network including a second digital interface for exchanging encoded information;
    an output sensor disposed in proximity to the load for sensing a parameter associated with the power generator output, the output sensor including a third digital interface for exchanging encoded information and generating a digital sensor signal via the third digital interface that varies in accordance with the sensed parameter; and
    a controller receiving the sensor signal and determining a control signal for output to the power generator, the controller including a fourth digital interface for exchanging encoded information which receives the sensor signal and generates the control signal via the fourth digital interface for communications with the first digital interface, wherein the power generator varies the output power in accordance with the control signal,
    wherein the first digital interface, the second digital interface, the third digital interface and the fourth digital interface operate in accordance with a communications protocol.

10. The power delivery system of claim 9 wherein the power generator further comprises:
    a power module for receiving an electrical energy input and generating an electrical energy output, the power module including a fifth digital interface for exchanging encoded information;
    a sensor module for monitoring the output of the power module, the sensor module having a sixth digital interface for exchanging encoded information and generating a digital sensor signal on the sixth digital sensor interface that varies in accordance with the electrical energy output; and
    a control module having a seventh digital interface for exchanging encoded information for receiving the sensor signal via the sixth digital interface, the control module determining parameters that vary in accordance with the electrical energy output, the seventh digital interface and the fifth digital interface being interconnected, wherein the control module generates a control signal for output through the seventh digital interface for input to the power module via the fifth digital interface.

11. The power delivery system of claim 9 further comprising a plurality of power modules, each power module receiving an electrical energy input and generating an electrical energy output, each power module having a fifth digital interface for exchanging encoded information, each fifth digital interface receiving a control signal from the measurement module for varying the electrical energy output.

12. The power delivery system of claim 11 further comprising a power combiner, the power combiner receiving the electrical energy output from at least two of the plurality of power modules and generating a combined electrical energy output in accordance therewith.

13. The power delivery system of claim 9 further comprising a digital data link interconnecting at least two digital interfaces to enable communications between the respective digital interfaces.

14. The power delivery system of claim 13 wherein the data link further comprises one of a low voltage differential communications link, a fiber optic communications link, an infrared communications link, a line of sight optical communications link, and a wireless communications link.

15. The power delivery system of claim 13 wherein the power generator, the impedance matching network, the output sensor, and the controller are interconnected in a network to enable communications therebetween.

16. The power delivery system of claim 9 further comprising an alternating current (AC) input module, the AC input module receiving an AC signal and delivering a DC signal to the controller, the AC input module having a fifth digital interface for exchanging encoded information and exchanging at least one of data and control commands with the controller via the fourth digital interface.

17. A power delivery system receiving an input power and generating an output power to a load comprising:
a power generator, the power generator receiving the input power and generating the output power;
an impedance matching network interposed between the power generator and the load;
an output sensor disposed in proximity to the load for sensing a parameter associated with the output power, the output sensor generating a digital sensor signal that varies in accordance with the sensed parameter;
a controller receiving the sensor signal and determining a digital control signal for output to the power generator, wherein the power generator varies the output power in accordance with the control signal; and
a digital interface interconnecting the controller and at least one of the power generator, the impedance matching network, and the output sensor, wherein the digital interface encodes and decodes the digital sensor signal and encodes and decodes the digital control signal and the digital sensor signal and the digital control signal are communicated via the digital interface in accordance with a communications protocol.

18. The power delivery system of claim 17 wherein the digital interface comprises one of a low voltage differential communications link, a fiber optic communications link, an infrared communications link, a line of sight optical communications link, and a wireless communications link.

19. The power delivery system of claim 17 wherein the power generator, the impedance matching network, the output sensor, and the controller digital interface defines a network interconnecting the network.

20. A power generator system comprising:
a power module for receiving an electrical energy input and generating an electrical energy output, the power module having a digital communications port;
a sensor module for monitoring the output of the power module, the sensor module having a digital communications port and generating a digital sensor signal on the digital communications port that varies in accordance with the electrical energy output;
a digital interface interconnecting the power module and the sensor module to enable digital communications therebetween, wherein the digital interface implements a communications protocol; and
a control module having a digital measurement input for receiving the sensor signal, the control module determining parameters that vary in accordance with the electrical energy output, the control module generating a digital control signal for controlling the power module.

21. The power generator system of claim 20 wherein the digital interface comprises one of a low voltage differential communications link, a fiber optic communications link, an infrared communications link, a line of sight optical communications link, and a wireless communications link.

22. The power generator system of claim 20 wherein the communications protocol includes error detection.

23. The power generator system of claim 20 further comprising a plurality of power modules, each power module receiving an electrical energy input and generating an electrical energy output, at least one power module power module communicating with the sensor module via the digital interface.

* * * * *

UNITED STATES PATENT AND TRADEMARK OFFICE
CERTIFICATE OF CORRECTION

PATENT NO.   : 6,778,921 B2
DATED        : August 17, 2004
INVENTOR(S)  : Anthony R. A. Keane et al.

It is certified that error appears in the above-identified patent and that said Letters Patent is hereby corrected as shown below:

Title page,
Item [75], Inventors, "Webster Road, NY" should be -- Webster, NY --.

Column 7,
Line 52, ""or" should be -- for --.

Column 8,
Line 15, before "control" delete "a".

Signed and Sealed this

Nineteenth Day of April, 2005

JON W. DUDAS
*Director of the United States Patent and Trademark Office*